INVENTOR
ROY P. SKERRITT
BY Barthel & Bugbee
ATTORNEYS

Feb. 24, 1970  R. P. SKERRITT  3,497,187
AIR-ROTATED POWER HUMIDIFIER
Filed May 14, 1968  2 Sheets-Sheet 2

INVENTOR
ROY P. SKERRITT

BY Barthel & Bugbee

ATTORNEYS

United States Patent Office 3,497,187
Patented Feb. 24, 1970

3,497,187
AIR-ROTATED POWER HUMIDIFIER
Roy P. Skerritt, 18411 Inkster Road,
Livonia, Mich. 48152
Filed May 14, 1968, Ser. No. 728,963
Int. Cl. F24f 3/14
U.S. Cl. 261—92        4 Claims

ABSTRACT OF THE DISCLOSURE

Dipping into a water pan in a casing connected by hot air inlet and humidified air outlet ducts at its opposite ends to the hot air supply side and cold air return side respectively of a furnace is the netting periphery of a cylindrical open-centered rotary drum having internal peripheral vanes. Water flows downward from a perforated water delivery pipe into an inclined laminated porous water delivery pad and thence onto the netting periphery, where it is evaporated by the hot air from the air inlet duct flowing through and rotating the drum. The thus-humidified air flows outward through the outlet duct into the furnace cold air return while the unevaporated water drops into the humidifier pan where the water level controls the flow of water to the water delivery pad above the drum.

---

Figure 1:
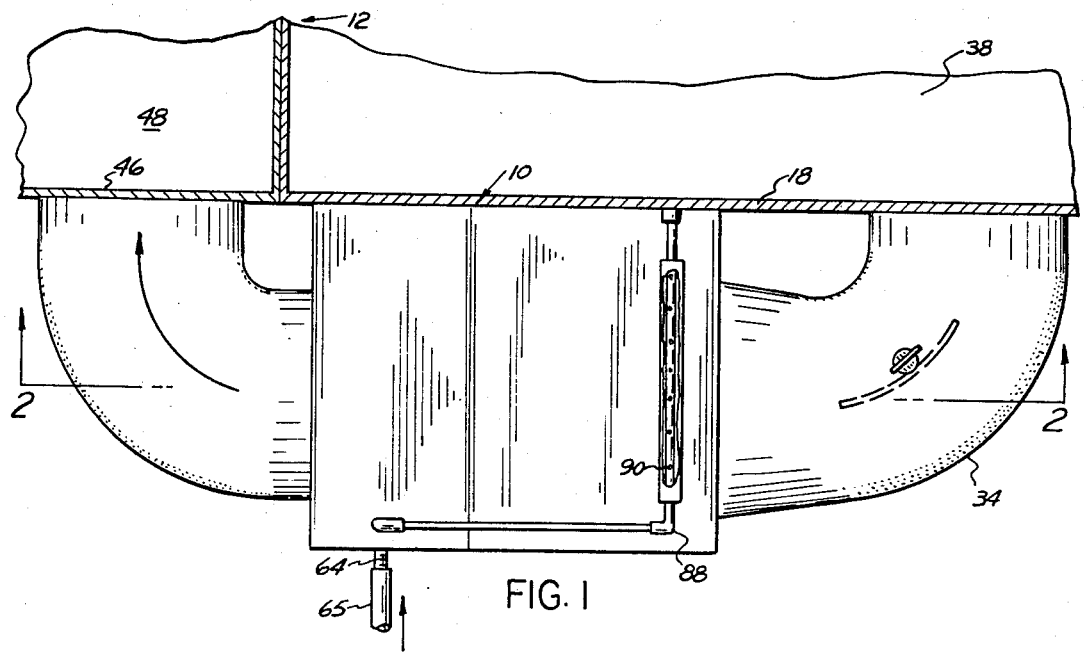
FIGURE 1 is a top plan view of an air-rotated power humidifier according to one form of the invention, with a portion of the furnace to which it is attached shown diagrammatically.
Figure 2:
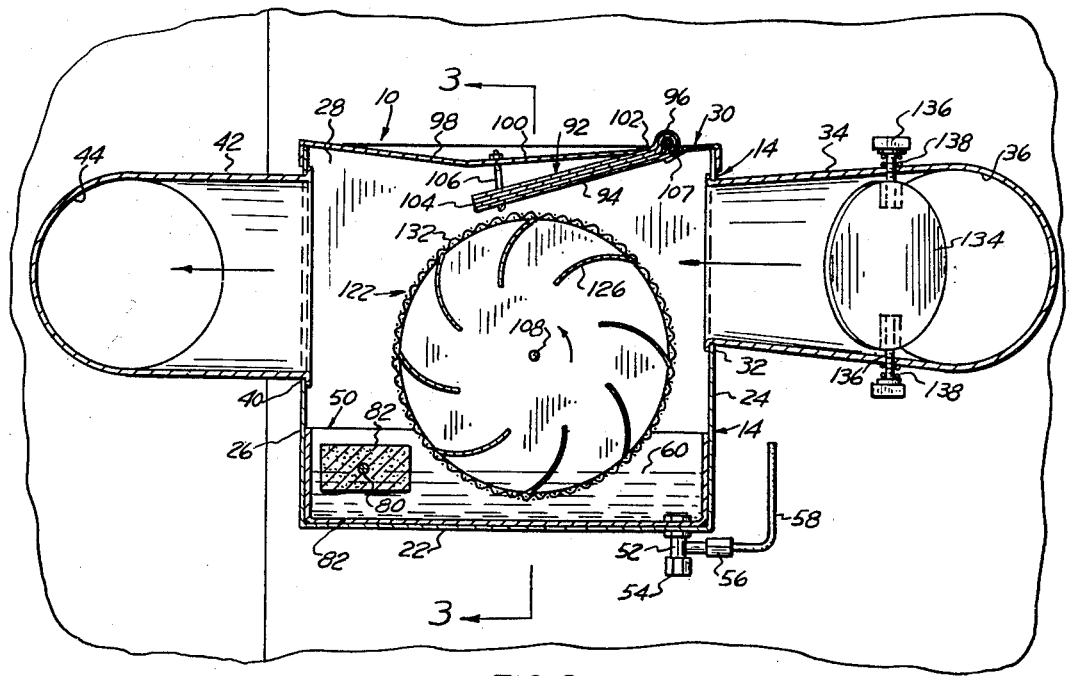
FIGURE 2 is a vertical longitudinal section taken along the line 2—2 in FIGURE 1.
Figure 3:
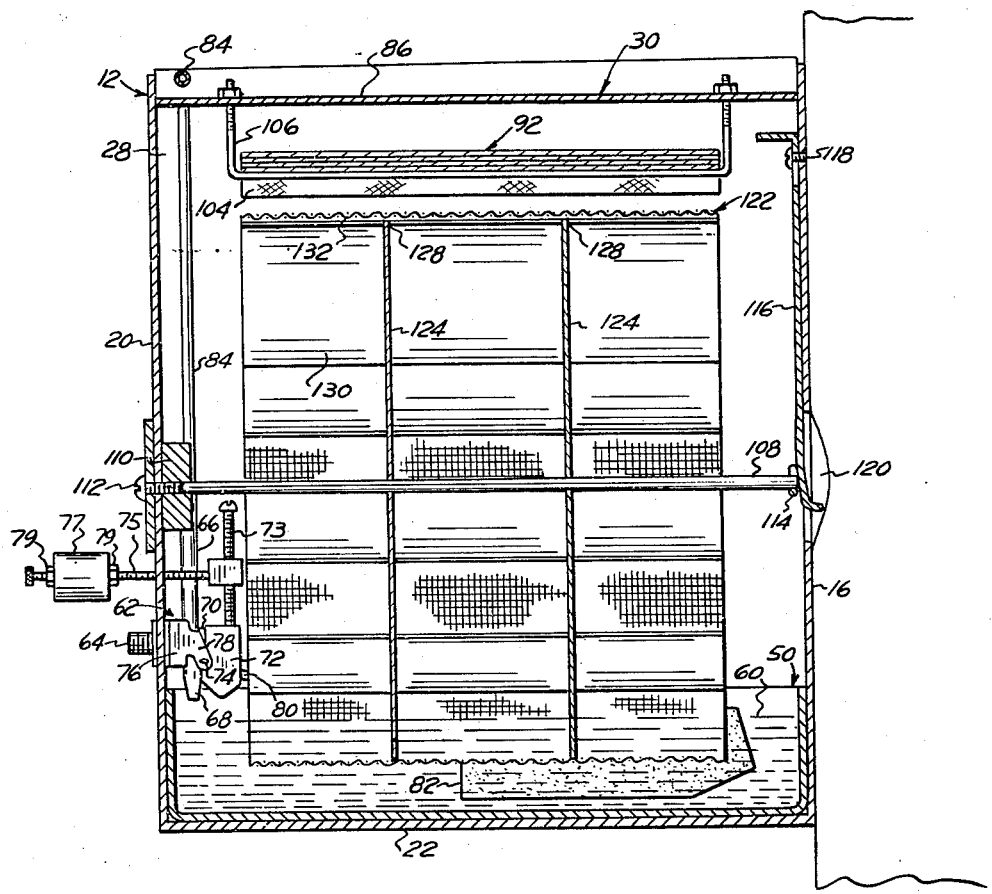
FIGURE 3 is a vertical cross-section taken along the line 3—3 in FIGURE 2.

Referring to the drawings in detail, FIGURES 1 to 3 inclusive show an air-rotated power humidifier, generally designated 10, as attached to a forced-air circulating heating system including a furnace 12, a portion of which is shown diagrammatically in FIGURE 1. The humidifier 10 is mounted in a rectangular box-shaped casing 14 with a rear wall 16 which is bolted or otherwise secured to a vertical wall 18 of the furnace 12. The casing 14 has a front wall 20, a bottom wall 22 and opposite end walls 24 and 26 respectively enclosing a humidifier chamber 28 closed by a flanged trough-shaped cover 30. The end wall 24 (FIGURE 2) is provided with an opening or air inlet port 32 to which is connected the inner end of a hot air elbow inlet duct 34, the outer end of which is connected to an opening 36 in the furnace wall 18 leading to the hot air chamber 38 of the furnace 12. The opposite end wall 26 is similarly provided with an opening or air outlet port 40 to which is connected the inner end of a humidified air outlet elbow duct 42, the outer end of which is connected to an opening 44 in the wall 46 of the furnace cold air return duct 48.

Mounted in the lower part of the chamber 28 and resting upon the bottom wall 22 is a humidifier water pan 50. The water pan 50 and bottom wall 22 are drilled in alignment with one another for the reception of a T fitting 52 (FIGURE 2) provided at its lower end with a drain cap 54 for draining the water pan 50 of silt, lime and other foreign matter. The fitting 52 is also connected by a coupling 56 to an L-shaped transparent plastic water gauge tube 58 which indicates visually the level 60 of the water in the pan 50.

The water level 60 and consequently the flow of water to the cover 30 of the humidifier 10 are controlled by an externally-adjustable float valve 62, the details of which are disclosed and claimed in my co-pending application Ser. No. 726,097 filed May 2, 1968, for Externally-Adjustable Humidifier Float Valve. For the purposes of the present invention, it is believed sufficient to state that the valve 62 consists of a threaded fitting 64 (FIGURE 3) extending through and bolted to the front wall 20 and connected by a pipe 65 leading to a source of water under pressure (not shown). The fitting 64 terminates at its inner end within the humidifier chamber 28 in a nozzle (not shown) which extends through the side wall of a resilient valve tube 66 of elastic deformable material, such as natural or synthetic rubber or resilient synthetic plastic and is closed at its lower end 68. The opposite side wall of the valve tube 66 is engaged by a contact pad 70 mounted on a movable float arm support 72 pivoted on a pin 74 to a stationary bracket 76 secured to the front wall 20 of the casing 12. The float arm support 72 carries a vertical adjustment arm 73 to which is attached a threaded horizontal adjustment arm 75 along which an adjusting counterweight 77 is slidable and is locked in its adjusted position by lock nuts 79. Secured to the float arm support 72 is one end of a float arm 80, the opposite end of which is embedded and seated in a float 82 of suitable buoyant material, such as foam glass and located in the water pan 50 where it controls the water level 60 therein.

As a consequence of the construction just described, when the water level 60 in the pan 50 rises to a predetermined point, the float 82 swings the float arm 80 and float arm support 72 upward counterclockwise around the pivot pin 74 to push the contact pad 70 against the adjacent side wall of the valve tube 66 and consequently to push the latter against the opening in the end nozzle of the fitting 64, closing it and shutting off the water flow. On the other hand, when the water level 60 falls below the said predetermined point, the consequent descent of the float 82 and the downward clockwise swinging of the float arm 80 and float arm support 72 around the pivot pin 74 releases the pressure of the contact pad 70 against the adjacent side wall of the valve tube 66. As a result thereof, the pressure of the water in the water supply fitting 64 pushes the valve tube wall away from the nozzle end opening so as to permit water to flow upward through the valve tube 66 to a flexible tube 84, the latter extending upward to and through the top wall 86 of the casing cover 30 to an angle water delivery pipe 88 mounted on top thereof.

The angle pipe 88 has longitudinally-spaced multiple outlet holes 90 through which the water flows downward along an inclined laminated guide plate or water delivery pad member 92 consisting of a plurality of plies or sheets 94 of porous water absorbent material, such as fibrous glass which are bent at 96 around the angle pipe 88 so as to receive water therefrom as well as be supported thereby. The cover 30 has two top wall portions 98 and 100 bent downward toward one another (FIGURE 2) and also has a slot 102 through which the guide plate 92 extends downward in an inclined direction with its lower end 104 supported by a U-shaped bracket rod 106 bolted to the downwardly-inclined top wall portion 100. The bent portions 96 of the porous sheets 94 rest upon a downwardly-inclined flap 107 which is punched out of the top wall portion 100 in making the slot 102 therein.

Journaled in the opposite walls 16 and 20 (FIGURE 3) is an axle 108, one end of which is rotatably supported in a bearing block 110 secured to the inside of the front wall 20 by a screw 112 threaded therethrough. The opposite end of the axle 108 is journaled in a wire loop member 114 secured to a removable plate 116 bolted at 118 to the end wall 16 in the manner disclosed and claimed in my abandoned co-pending application Ser. No. 700,626 filed Jan. 25, 1968, for Air-Powered Rotary Humidifier. The end wall 16 is apertured and bent outward at 120 to facilitate such removal. The details of the removable mounting of the axle 108 are beyond the scope of the present invention.

Rotatably mounted upon the axle 108 is a humidifier drum, generally designated 122, of which the axle 108 forms an integral part rotatable unitarily therewith. The humidifier drum 122 includes a pair of supporting discs 124 mounted on and secured to the axle 108 and slotted accurately as at 126 inwardly from their peripheries 128 (FIGURE 2) to receive correspondingly arcuate vanes 130. The axle 108 is so mounted in the casing 14 that the vanes 126 which are momentarily uppermost lie in the path of the hot air entering from the hot air inlet duct 34, whereby this hot air impinges upon the vanes 126 and rotates the drum 122. Extending around the peripheries 128 of the supporting discs 124 is a perforated peripheral member or portion 132 in the form of a cylinder of netting such as metal wire or synthetic plastic mesh. The cylindrical peripheral netting member 132 lies beneath the lower end 104 of the laminated porous guide plate 92 so as to receive water flowing or dripping therefrom.

In order to regulate the flow of heated air entering through the hot air inlet duct 34 from the hot air chamber 38 of the furnace 12 and consequently to regulate the rate of humidification, a damper 134 (FIGURE 2) is mounted therein upon vertical headed pivot pins 136 and held in its adjusted position by compression springs 138 disposed between the headed pins 136 and the adjacent walls of the inlet duct 34. The inlet duct 34 is preferably tapered toward the casing wall 24 so as to cause a slight compression of the heated air stream as it passes through the inlet opening 32 immediately before impinging upon the vanes 126. The downward inclination of the guide plate 94 also serves to further compress the incoming heated air entering from the heated air inlet duct 34 so as to create a venturi effect which increases the velocity of flow of the heated air past the mesh periphery 132 of the humidifier drum 122.

In the operation of the humidifier 10, let it be assumed that the threaded fitting 64 and its water pipe 65 have been connected to a source of water under pressure, such as an ordinary house water main and that the furnace 12 has been placed in operation so as to supply hot air through the opening 36 to the heated air inlet duct 34 and to withdraw humidified air through the humidified air outlet duct 42 leading to the cold air return duct 48. Since at this time the water pan 50 is assumed to be empty, the float 82 of the float valve 62 is assumed to be in its lowermost position, withdrawing the contact pad 70 from closing engagement of the valve tube 66 with the valve nozzle (not shown) at the inner end of the threaded fitting 64.

As a consequence, water flows from the pipe 65 through the float valve 62 and upward through the tubes 66 and 84 to the perforated angle pipe 88, whence it flows out of the holes 90 therein onto the porous laminated guide plate 92, which it saturates. The water then flows or dips off the lower end 104 of the guide plate 92 (FIGURE 2) and downward through the mesh peripheries 132 of the humidifier drum 122 into the water pan 50. The water rises in the pan 50 to a level 60 above the mesh periphery 132 of the humidifier drum 122 which is sufficient to raise the float 82 and shut off the flow of water upward through the float valve 62.

Assisted by the suction effect from the cold air return duct 48, the flow of heated air in the direction of the right-hand arrow in FIGURE 2 has set the humidifier drum 122 in motion by acting against the vanes 126 thereof so that its mesh periphery 132 draws up water from the pan 50. Meanwhile, the water dropping from the lower end 104 of the porous guide plate 92 falls in rivulets whose weight further assists in rotating the humidifier drum 122. The meshes of the screen periphery 132 of the rotating humidifier drum 122 thus become saturated with water. The heated air entrains much of this water as it flows through the meshes of the humidifier drum 122, humidifying the air as it passes in the direction of the left-hand arrow of FIGURE 2 through the opening 44 into the cold air return duct 48 of the furnace 12. The multiple plies of the porous guide plate sheets 94 minimize clogging of the pores thereof. The moisture-beaded under surface serves as an additional evaporative surface, and the movement of hot air compressed against this moist bottom surface creates added evaporation. The portion of the water not evaporated from the porous guide plate 94 trickles downward upon the rearward or downward-turning side of the humidifier drum 122. This provides a second curtain of water through which the heated air from the furnace must pass, on its way to the outlet duct, after traversing the first curtain of water on the forward or upward-turning side of the humidifier drum 122. In this manner, the present invention provides three evaporation locations in the path of the heated air traversing the humidifier 10 from the inlet duct 34 to the outlet duct 42.

The force of the air impinging on the humidifier drum 122 and the weight of the water rivulets dropping thereon from the guide plate 92 by themselves would cause the drum 122 to rotate too rapidly to properly evaporate the water on the periphery 132 thereof. Such excessive rotation is prevented by the immersion of the drum 122 as its mesh periphery 132 and vanes 126 pass through the water in the pan 50. The retardation effect of the water in the pan 50 upon the drum 122 is adjusted to obtain a rate of rotation thereof of approximately two or three revolutions per minute by adjusting the depth of the water in the pan 50. This is done externally of the humidifier casing 14 by moving the counterweight 77 along the horizontal arm 75.

What I claim is:

1. An air-rotated humidifier adapted to be installed in a forced-air-circulating heating system, said humidifier comprising
   a casing having a water receptacle in the lower portion thereof and having a heated air inlet port and a humidified air outlet port disposed in horizontally-spaced relationship at opposite ends of said casing and adapted to be connected into said system respectively to receive the heated air stream from said system and to discharge humidified air into said system,
   an open-centered humidifier drum mounted between said ports for rotation upon a horizontal axis within said casing,
      said drum having a perforated peripheral portion and also having means thereon responsive to the flow of heated air horizontally from said inlet port through said drum to said outlet port for rotating said drum,
   a porous plate-shaped water delivery member positioned above said drum to deposit water on said perforated peripheral portion, and
   water supply means connected to deliver water to said water delivery member.

2. An air-rotated power humidifier, according to claim 1, wherein said water delivery member is a downwardly-inclined pad of porous material.

3. An air-rotated power humidifier, according to claim 2, wherein said water supply means includes a horizontal perforated water delivery pipe and wherein said water delivery member includes a pad composed of a plurality of plies of porous sheet material folded reversely around said pipe.

4. An air-rotated power humidifier, according to claim 1, wherein said water delivery member is inclined downward toward said peripheral portion of said drum in converging relationship thereto with the lower end of said water delivery member disposed above said peripheral portion of said drum.

References Cited
UNITED STATES PATENTS

| | | |
|---|---|---|
| 1,074,037 | 9/1913 | Barry _____ 261—92 X |
| 2,225,954 | 12/1940 | Grubb. |
| 2,271,342 | 1/1942 | Korts. |
| 2,516,103 | 7/1950 | Brown _____ 261—92 |
| 2,580,826 | 1/1952 | Osburn et al. _____ 261—92 X |
| 3,105,860 | 10/1963 | Dunn. |
| 3,157,351 | 11/1964 | Sevald _____ 261—92 |
| 3,212,492 | 10/1965 | Himmerich et al. ____ 261—92 X |
| 3,274,992 | 9/1966 | Martin _____ 261—92 X |
| 3,298,676 | 1/1967 | Moore _____ 261—92 X |
| 3,318,587 | 5/1967 | McDuffee _____ 261—64 |

TIM R. MILES, Primary Examiner

U.S. Cl. X.R.

261—64